(12) United States Patent
Aufdencamp

(10) Patent No.: US 12,545,398 B2
(45) Date of Patent: Feb. 10, 2026

(54) USE OF PROFILED REACTION FACE IN HYBRID TORQUE BAR APPLICATIONS

(71) Applicant: Goodrich Corporation, Charlotte, NC (US)

(72) Inventor: Ryan Aufdencamp, Cincinnatti, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 394 days.

(21) Appl. No.: 18/107,831

(22) Filed: Feb. 9, 2023

(65) Prior Publication Data

US 2024/0270019 A1    Aug. 15, 2024

(51) Int. Cl.
| | |
|---|---|
| *B64C 25/36* | (2006.01) |
| *B64C 25/42* | (2006.01) |
| *F16D 65/12* | (2006.01) |
| *F16D 55/38* | (2006.01) |
| *F16D 55/40* | (2006.01) |
| *F16D 65/02* | (2006.01) |

(52) U.S. Cl.
CPC .............. *B64C 25/36* (2013.01); *B64C 25/42* (2013.01); *F16D 65/123* (2013.01); *B60B 2900/141* (2013.01); *B60B 2900/212* (2013.01); *F16D 55/38* (2013.01); *F16D 55/40* (2013.01); *F16D 2065/1364* (2013.01)

(58) Field of Classification Search
CPC ......... B64C 25/36; B64C 25/42; F16D 55/38; F16D 55/40; F16D 2065/1364; F16D 2065/138; F16D 2065/1392; F16D 65/12; F16D 65/123
See application file for complete search history.

(56) References Cited

U.S. PATENT DOCUMENTS

| | | | | |
|---|---|---|---|---|
| 5,851,056 | A | * | 12/1998 | Hyde ..................... B60B 19/10 188/264 G |
| 5,931,269 | A | | 8/1999 | Detwiler et al. |
| 6,003,954 | A | | 12/1999 | Everhard et al. |
| 11,053,995 | B2 | | 7/2021 | French et al. |
| 11,231,081 | B2 | | 1/2022 | Hoglund et al. |
| 11,408,473 | B2 | | 8/2022 | Laget et al. |
| 2010/0025172 | A1 | | 2/2010 | Campbell |
| 2014/0175860 | A1 | * | 6/2014 | Crescenzo .............. B64C 25/36 301/64.305 |

(Continued)

OTHER PUBLICATIONS

European Patent Office, European Search Report dated Jun. 11, 2024 in Application No. 23216881.5.

*Primary Examiner* — Kip T Kotter
(74) *Attorney, Agent, or Firm* — SNELL & WILMER L.L.P.

(57) ABSTRACT

A torque bar is disclosed herein. The torque bar includes a body, a distal end, and a proximal end. The proximal end includes a horizontal portion having a first side and a second side, a first vertical portion having a first end and a second end, the first vertical portion coupled to the first side of the horizontal portion between the first end and the second end, a second vertical portion having a third end and a fourth end, the second vertical portion coupled to the second side of the horizontal portion between the third end and the fourth end, wherein a first profile is formed in the first end of the first vertical portion and a second profile is formed in the third end of the second vertical portion.

17 Claims, 7 Drawing Sheets

(56) References Cited

U.S. PATENT DOCUMENTS

| | | | |
|---|---|---|---|
| 2015/0308526 A1* | 10/2015 | Swank | F16D 65/02 |
| | | | 419/53 |
| 2017/0174328 A1 | 6/2017 | Rook | |
| 2017/0174330 A1 | 6/2017 | Rook | |
| 2019/0113092 A1 | 4/2019 | French et al. | |
| 2019/0331178 A1* | 10/2019 | Steele | F16F 7/08 |
| 2021/0262526 A1* | 8/2021 | Fish | F16D 3/06 |

* cited by examiner

USE OF PROFILED REACTION FACE IN HYBRID TORQUE BAR APPLICATIONS

FIELD

The present disclosure generally relates to aircraft wheel assemblies, and more specifically, to torque bars used in aircraft wheel assemblies.

BACKGROUND

Aircraft wheel assemblies generally include a wheel, a drive lug coupled to the wheel, and torque bars or drive inserts coupled to the wheel at two or more points via drive lugs, bolted joints, or pins. In various aircraft wheel assemblies, such as hybrid torque bar applications, the torque bar is coupled to the wheel via a drive lug at one end and a point at the other end. Hybrid torque bar applications generally experience loading on the torque bar that increases and decreases causing the torque bar to deflect under load. Hybrid torque bar applications may suffer from damage to the wheel drive lugs due to uneven loading caused by this torque bar deflection. This damage can lead to corrosion issues during use and customer complaints due to the corrosion.

SUMMARY

Disclosed herein is a torque bar. The torque bar includes a body, a distal end, and a proximal end, the proximal end including a horizontal portion having a first side and a second side, a first vertical portion having a first end and a second end, the first vertical portion coupled to the first side of the horizontal portion between the first end and the second end, a second vertical portion having a third end and a fourth end, the second vertical portion coupled to the second side of the horizontal portion between the third end and the fourth end, where a first profile is formed in the first end of the first vertical portion and a second profile is formed in the third end of the second vertical portion.

In various embodiments, the first profile has a first radius of curvature and the second profile has a second radius of curvature. In various embodiments, the first radius of curvature is the same as the second radius of curvature. In various embodiments, the first radius of curvature is different than the second radius of curvature. In various embodiments, the first radius of curvature is about 50 inches to about 120 inches.

In various embodiments, the first profile is chamfered and the second profile is chamfered. In various embodiments, the first vertical portion further includes a sidewall intersecting a top surface, the first profile being formed at an intersection of the sidewall and the top surface.

Also disclosed herein is a wheel assembly. The wheel assembly includes a wheel having an axially exterior outer edge and an axially interior surface, a drive lug coupled to the axially exterior outer edge, and a torque bar coupled to the wheel and the drive lug. The torque bar includes a proximal end coupled to the drive lug, and a distal end coupled to the axially interior surface of the wheel, where the proximal end includes a horizontal portion having a first side and a second side, a first vertical portion having a first end and a second end, the first vertical portion coupled to the first side of the horizontal portion between the first end and the second end, a second vertical portion having a third end and a fourth end, the second vertical portion coupled to the second side of the horizontal portion between the third end and the fourth end, where a first profile is formed in the first end of the first vertical portion and a second profile is formed in the third end of the second vertical portion.

In various embodiments, the first profile has a first radius of curvature and the second profile has a second radius of curvature. In various embodiments, the first radius of curvature is the same as the second radius of curvature. In various embodiments, the first radius of curvature is different than the second radius of curvature. In various embodiments, the first radius of curvature is about 50 inches to about 120 inches. In various embodiments, the first profile is chamfered and the second profile is chamfered. In various embodiments, the first vertical portion further includes a sidewall intersecting a top surface, the first profile being formed at an intersection of the sidewall and the top surface.

Also disclosed herein is a brake assembly including a wheel, a drive lug coupled to the wheel, and a torque bar coupled to an inner periphery of the wheel and the drive lug. The torque bar includes a proximal end coupled to the drive lug, the proximal end including a horizontal portion having a first side and a second side, a first vertical portion having a first end and a second end, the first vertical portion coupled to the first side of the horizontal portion between the first end and the second end, and a first profile formed in the first end of the first vertical portion.

In various embodiments, the proximal end of the torque bar further includes a second vertical portion having a third end and a fourth end, the second vertical portion coupled to the second side of the horizontal portion between the third end and the fourth end and a second profile formed in the third end of the second vertical portion. In various embodiments, the first profile has a first radius of curvature and the second profile has a second radius of curvature. In various embodiments, the first radius of curvature is about 50 inches to about 120 inches.

In various embodiments, the first radius of curvature is different than the second radius of curvature. In various embodiments, the horizontal portion physically contacts the drive lug.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1A:
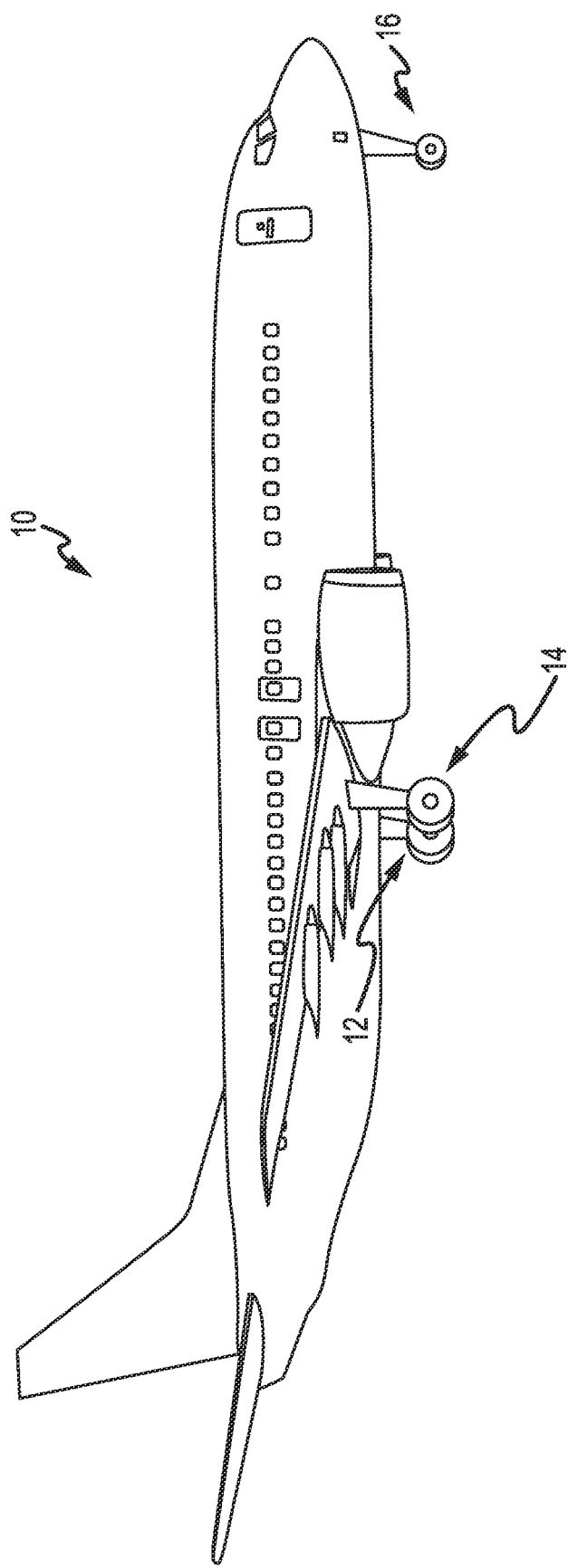
FIG. 1A illustrates an exemplary aircraft having a wheel and brake system, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein is a torque bar for use in an aircraft wheel assembly including a wheel and a lug, the torque bar being coupled to the wheel and the lug. The torque bar includes, in various embodiments, a reaction face that contacts a lug face. In various embodiments, the torque bar reaction face includes a tailored profiling that utilizes deflection of the torque bar to reduce and linearize contact stresses along the lug face at any given load. In various embodiments, the torque bar includes torque bar ears that deflect in response to a load increase. In various embodiments, the deflecting torque bar ears cause an increase in contact area with the wheel lug, resulting in improved load distribution. In various embodiments, the load may be distributed evenly along the lug face for various loading condition (e.g., minimum torque) up to a given load condition (i.e., peak torque). In various embodiments, profiling of the reaction faces reduces lug damage and subsequent corrosion found in current hybrid torque bar setups as compared to non-profiled surfaces. In various embodiments, profiling the torque bar surfaces may add no additional components and only adds a minimal cost to each torque bar. In various embodiments, currently fielded torque bars may be updated to include a profiled surface with minimal effort.

Referring to FIG. 1A, in accordance with various embodiments, an aircraft 10 is illustrated. The aircraft 10 includes landing gear, which may include a left main landing gear 12, a right main landing gear 14 and a nose landing gear 16. The landing gear support the aircraft 10 when it is not flying, allowing the aircraft 10 to taxi, take off and land without damage. While the disclosure refers to the three landing gear configurations just referred, the disclosure nevertheless contemplates any number of landing gear configurations.

Figure 1B:
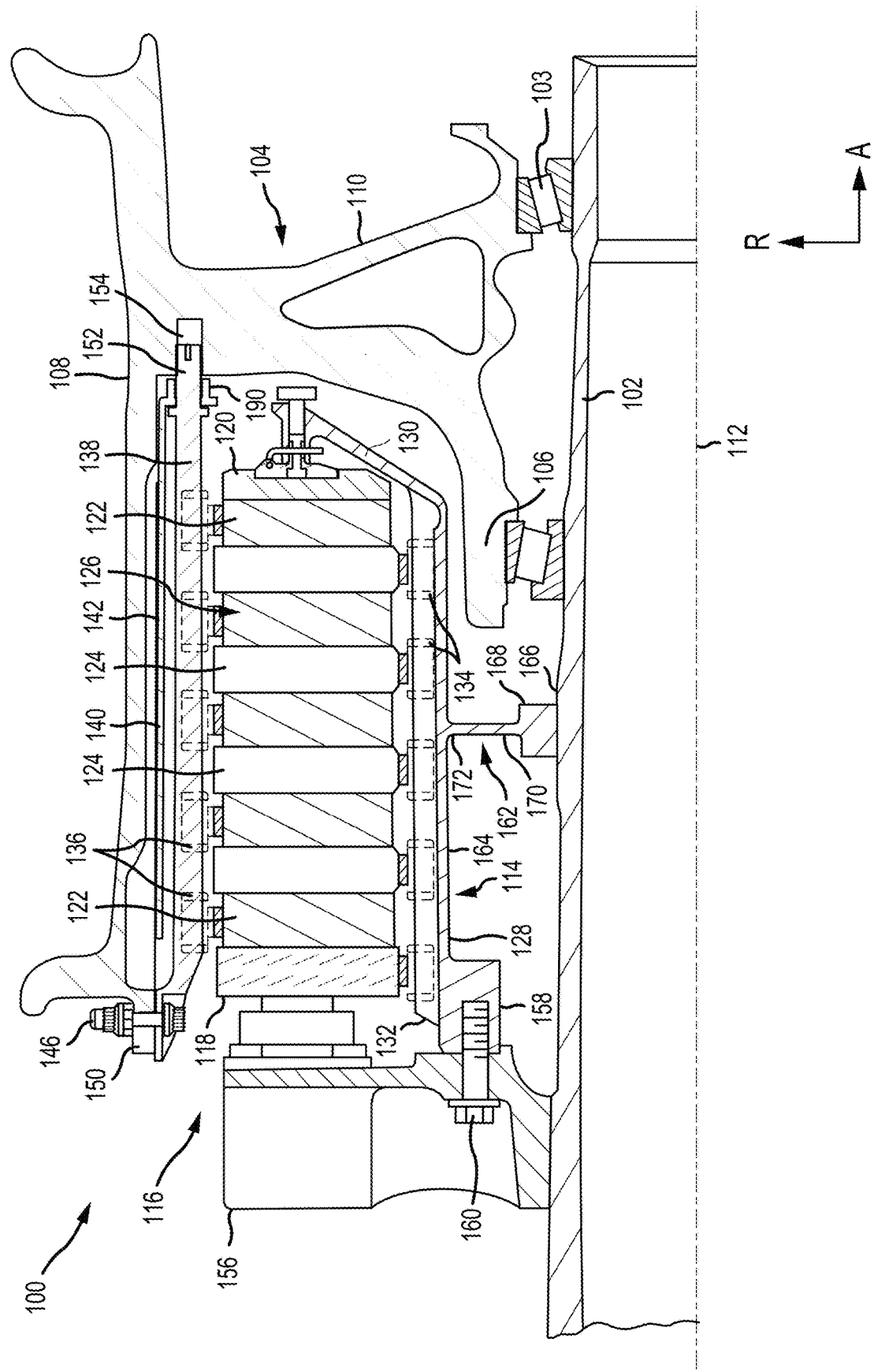
FIG. 1B illustrates a cross-sectional view of a wheel and brake assembly, in accordance with various embodiments.

Referring now to FIG. 1B, there is schematically depicted a brake mechanism 100 that may be used by the aircraft 10 of FIG. 1A or any other appropriate aircraft. The brake mechanism 100 is mounted on an axle 102 for use with a wheel 104 disposed on and configured to rotate about the axle 102 via one or more bearing assemblies 103. The wheel 104 includes a hub 106, a wheel well 108 concentric about the hub 106 and a web portion 110 interconnecting the hub 106 and the wheel well 108. A central axis 112 extends through the axle 102 and defines a center of rotation of the wheel 104. A torque plate barrel 114 (sometimes referred to as a torque tube or barrel or a torque plate or back leg) is aligned concentrically with the hub 106, and the wheel 104 is rotatable relative to the torque plate barrel 114.

The brake mechanism 100 includes a piston assembly 116, a pressure plate 118 disposed adjacent the piston assembly 116, an end plate 120 positioned a distal location from the piston assembly 116, and a plurality of rotor disks 122 interleaved with a plurality of stator disks 124 positioned intermediate the pressure plate 118 and the end plate 120. The pressure plate 118, the plurality of rotor disks 122, the plurality of stator disks 124 and the end plate 120 together form a brake heat sink or brake stack 126. The pressure plate 118, the end plate 120 and the plurality of stator disks 124 are mounted to the torque plate barrel 114 and remain rotationally stationary relative to the axle 102.

The torque plate barrel 114 may include an annular barrel or torque tube 128 and an annular plate or back leg 130. The back leg 130 is disposed at an end distal from the piston assembly 116 and may be made monolithic with the torque tube 128, as illustrated in FIG. 1B, or may be made as a separate annular piece and suitably connected to the torque tube 128. The torque tube 128 has a plurality of circumferentially spaced and axially extending splines 132 disposed on an outer surface of the torque tube 128. The plurality of stator disks 124 and the pressure plate 118 include notches or stator slots 134 on an inner periphery of the disks and the plate for engagement with the splines 132, such that each disk and the plate are axially slidable with respect to the torque tube 128.

The end plate 120 is suitably connected to the back leg 130 of the torque plate barrel 114 and is held non-rotatable, together with the plurality of stator disks 124 and the pressure plate 118, during a braking action. The plurality of rotor disks 122, interleaved between the pressure plate 118, the end plate 120 and the plurality of stator disks 124, each have a plurality of circumferentially spaced notches or rotor lugs 136 along an outer periphery of each disk for engagement with a plurality of torque bars 138, each of which is secured to or made monolithic with an inner periphery of the wheel 104.

An actuating mechanism for the brake mechanism 100 includes a plurality of piston assemblies, including the piston assembly 116, circumferentially spaced around an annular piston housing 156 (only one piston assembly is illustrated in FIG. 1B). Upon actuation, the plurality of piston assemblies affect a braking action by urging the pressure plate 118 and the plurality of stator disks 124 into frictional engagement with the plurality of rotor disks 122 and against the end plate 120. Fluid or hydraulic pressure, mechanical springs or electric actuators, among other mechanisms, may be used to actuate the plurality of piston assemblies. Through compression of the plurality of rotor disks 122 and the plurality of stator disks 124 between the pressure plate 118 and the end plate 120, the resulting frictional contact slows or stops or otherwise prevents rotation of the wheel 104. The plurality of rotor disks 122 and the plurality of stator disks 124 are fabricated from various materials, such as ceramic matrix composites, that enable the brake disks to withstand and dissipate the heat generated during and following a braking action.

The torque plate barrel 114 is secured to a stationary portion of the landing gear such as the axle 102, preventing the torque plate barrel 114 and the plurality of stator disks 124 from rotating during braking of the aircraft. The torque tube 128 portion of the torque plate barrel 114 may be attached to the annular piston housing 156 via an annular mounting surface 158, wherein bolt fasteners 160 secure the torque plate barrel 114 to the annular piston housing 156. A spacer member or pedestal 162 is positioned between an inner diameter surface 164 of the torque tube 128 and an outer diameter surface 166 of the axle 102. The pedestal 162 includes a radially inner surface or foot 168 for engaging the axle 102, a web portion 170 radially outward of the foot 168 and a head portion 172 for engaging the inner diameter surface 164 of the torque tube 128. The pedestal 162 augments support of the torque plate barrel 114 within the brake mechanism 100 generally and, more particularly, against the axle 102. The pedestal 162 may be made monolithic with the torque tube 128 portion of the torque plate barrel 114.

A heat shield 140 is secured directly or indirectly to the wheel 104 between a radially inward surface of the wheel well 108 and the plurality of torque bars 138. As illustrated in FIG. 1B, the heat shield 140 is concentric with the wheel well 108 and may have a plurality of heat shield sections 142 disposed between respective, adjacent pairs of the plurality of torque bars 138. The heat shield 140 is, or heat shield sections 142 are, spaced from the radially inward surface of the wheel well 108 and secured in place by heat shield tabs 190, such that the heat shield 140 is, or heat shield sections 142 are, disposed generally parallel to the axis of rotation or central axis 112 of the wheel 104 and intermediate the plurality of torque bars 138 and the radially inward surface of the wheel well 108.

The plurality of torque bars 138 is attached to the wheel 104 at axially inboard ends of the torque bars by torque bar bolts 146. The torque bar bolts 146 extend through respective holes in a flange 150 provided on the wheel 104 as shown, which flange 150 for purposes of the present description is intended to be considered as part of the wheel well 108. Each of the plurality of torque bars 138 may include a pin 152 or similar member at its axially outboard end (i.e., the end opposite the torque bar bolts 146) that is received within a hole 154 disposed proximate the web portion 110 of the wheel 104. The heat shield 140, or heat shield sections 142, is positioned adjacent a radially inward surface of the wheel well 108 and secured in place by the heat shield tabs 190.

Each brake assembly, including the torque plate barrel 114, is designed for a specific application and for specific modes of operation. The size (e.g., length, diameter, thickness, etc.) and material of the torque plate barrel 114 may be modified to suit a particular application or improve a mode of operation. Different modes of operation that are considered include whirl, squeal, and disc squeal, for example. Additional design considerations include dynamic stability, such as torsional compliance, axial compliance, and structural asymmetry, and cooling of the brake assembly, including the torque plate barrel 114.

Figure 2A:
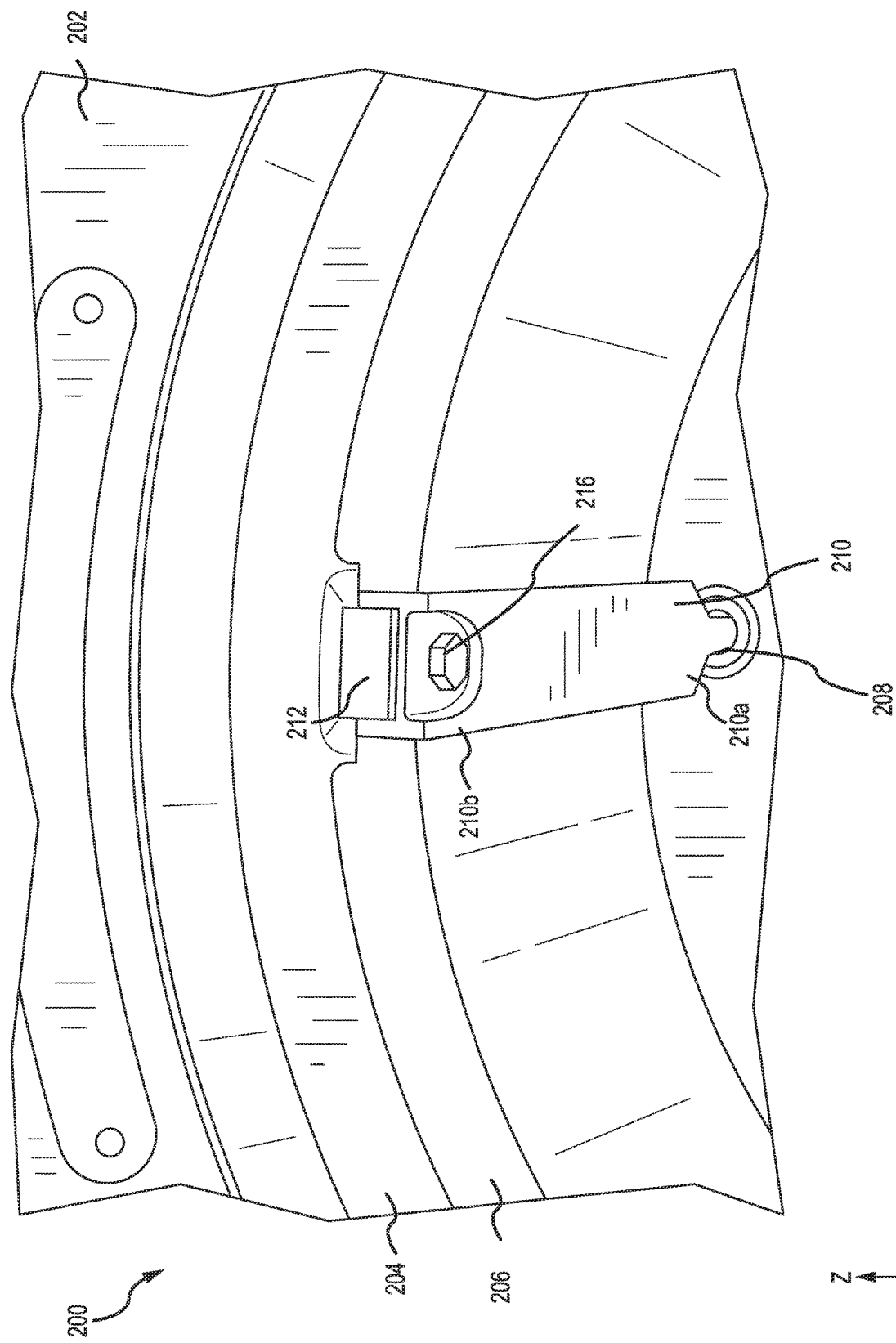
FIGS. 2A and 2B illustrate wheel assembly including a hybrid torque bar, in accordance with various embodiments.
Figure 2B:
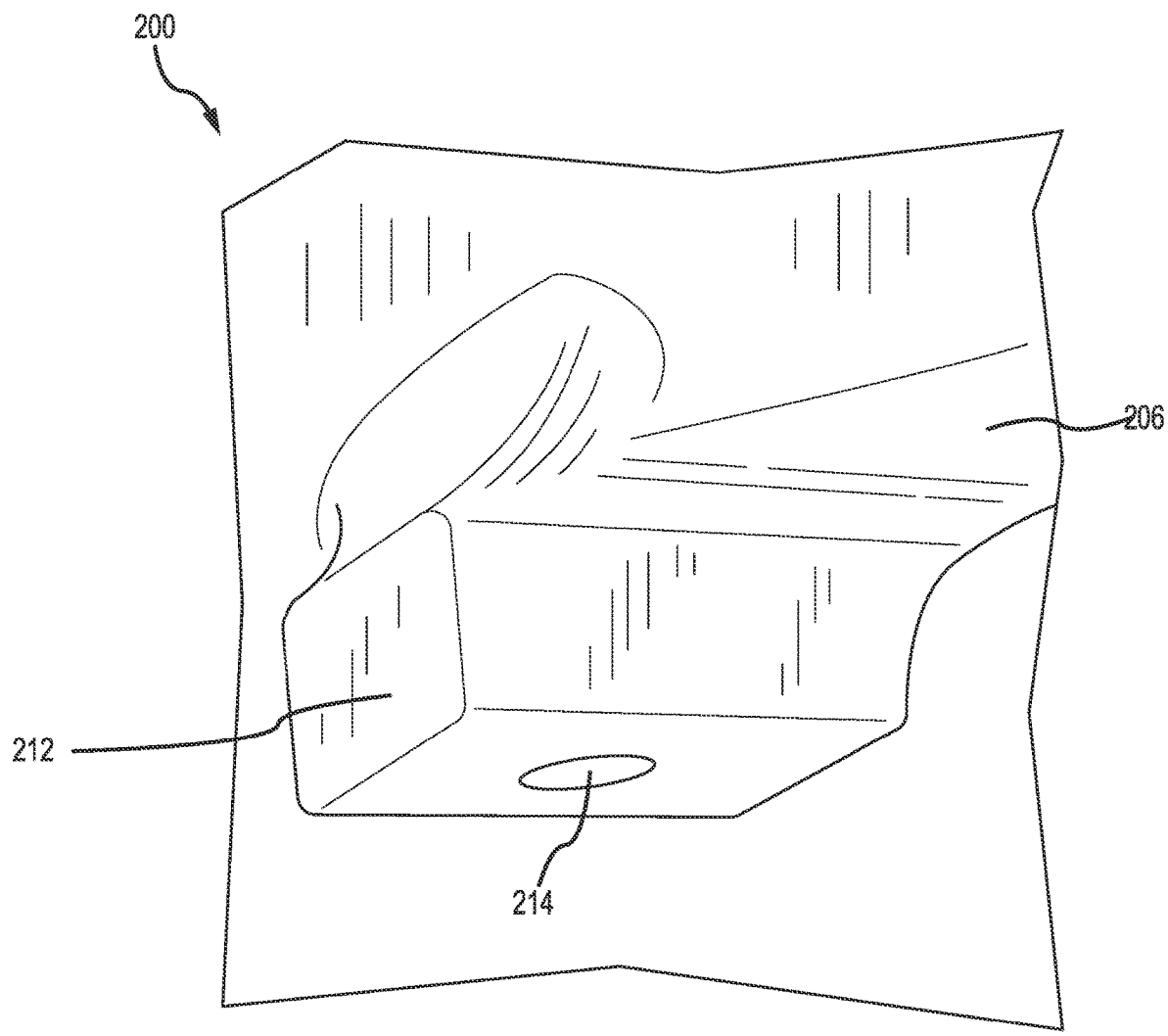

Referring now to FIGS. 2A and 2B, a wheel assembly 200 is illustrated, in accordance with various embodiments. Wheel assembly 200 includes a tire 202, a wheel 204, an inner rim 206, a torque bar 210, and a wheel drive lug 212 coupled to inner rim 206. Torque bar 210 has a distal end 210a configured to be coupled to wheel 204 and a proximal end 210b configured to be coupled to wheel drive lug 212. Wheel 204 includes a hole 208 that is configured to receive distal end 210a of torque bar 210, securing torque bar 210 to wheel 204. A bolt 216 may be used to secure torque bar 210 to wheel drive lug 212. Bolt 216 extends through a hole in torque bar 210 and into a hole 214 in wheel drive lug 212, securing proximal end 210b of torque bar 210 to wheel drive lug 212.

Figure 3A:
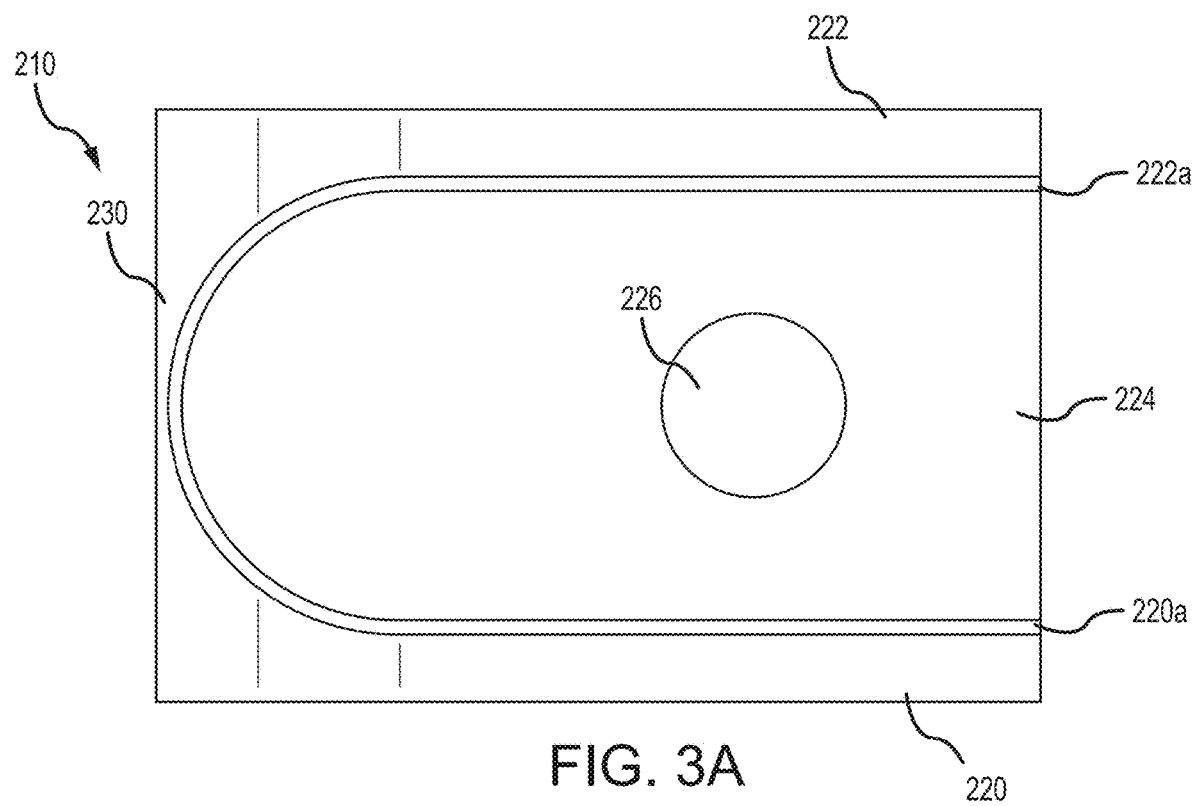
FIGS. 3A-3D illustrate a profiled reaction face of a hybrid torque bar, in accordance with various embodiments.
Figure 3B:
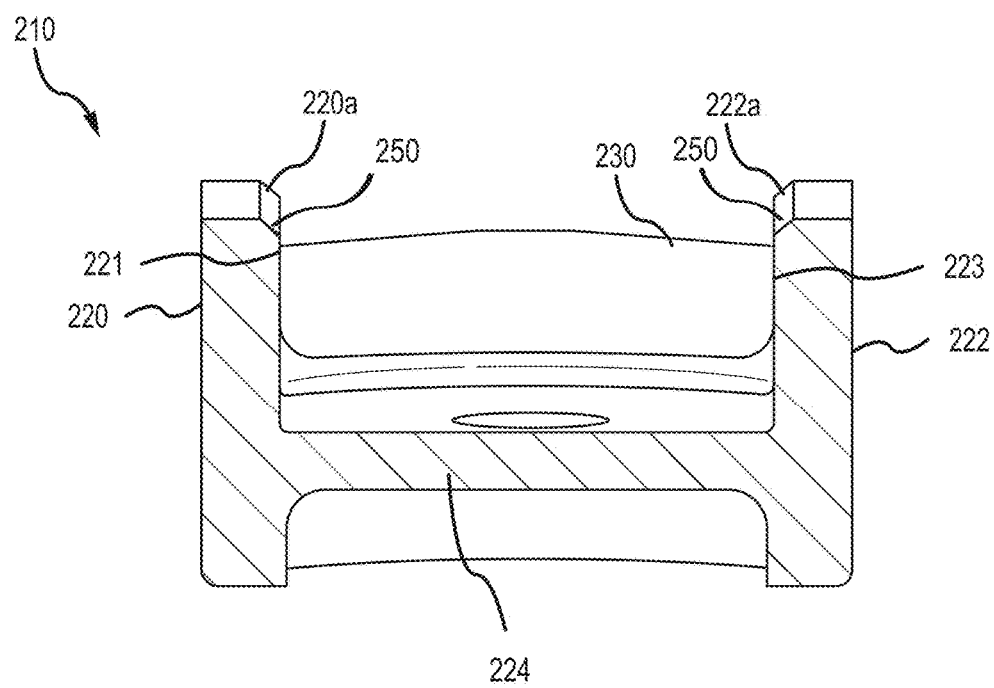

Referring now to FIGS. 3A and 3B, and with continued reference to FIGS. 2A and 2B, proximal end 210 b of torque bar 210 is illustrated, in accordance with various embodiments. Torque bar 210, and more specifically, proximal end 210 b of torque bar 210 includes a first vertical portion 220, a second vertical portion 222, and a horizontal portion 224 extending from first vertical portion 220 to second vertical portion 222. First vertical portion 220 and second vertical portion 222 may also be referred to as torque bar ears. Torque bar 210 further includes a hole 226 extending through horizontal portion 224 to receive bolt 216. With respect to FIGS. 3C and 3D, torque bars 310, 410 may be similar to torque bar 210. As such, like numbering represents like features.

Proximal end 210 b of torque bar 210, and more specifically, first vertical portion 220, 320, 420, second vertical portion 222, 322, 422, and horizontal portion 224, 324, 424 physically contact wheel drive lug 212. As torque bar 210, 310, 410 is loaded during use, the ears (i.e., first vertical portion 220, 320, 420 and second vertical portion 222, 322, 422) of torque bar 210, 310, 410 deflect.

As disclosed herein, torque bar 210, 310, 410, and more specifically, first vertical portion 220, 320, 420 has a first machined profile 220 a, 320 a, 420 a and second vertical portion 222, 322, 422 has a second machined profile 222 a, 322 a, 422 a. First machined profile 220 a, 320 a, 420 a and second machined profile 222 a, 322 a, 422 a cause initial contact between wheel drive lug 212 and torque bar 210, 310, 410 to be towards an inboard side of wheel drive lug 212 (e.g., the positive y-direction). That is, a first contact patch having a first size is defined by the surfaces of torque bar 210, 310, 410 that contact wheel drive lug 212. As the load on torque bar 210, 310, 410 increases, the ears of torque bar 210, 310, 410 deflect. That is, first vertical portion 220, 320, 420 that is above horizontal portion 224, 324, 424 moves away from second vertical portion 222, 322, 422 that is above horizontal portion 224, 324, 424. As a result of the deflection, the contact patch between torque bar 210, 310, 410 and wheel drive lug 212 increases. This increase in contact patch size decreases the stress on wheel drive lug 212 at any given load. Accordingly, this results in a uniform stress as the load increases from zero to a maximum load.

Figure 3C:
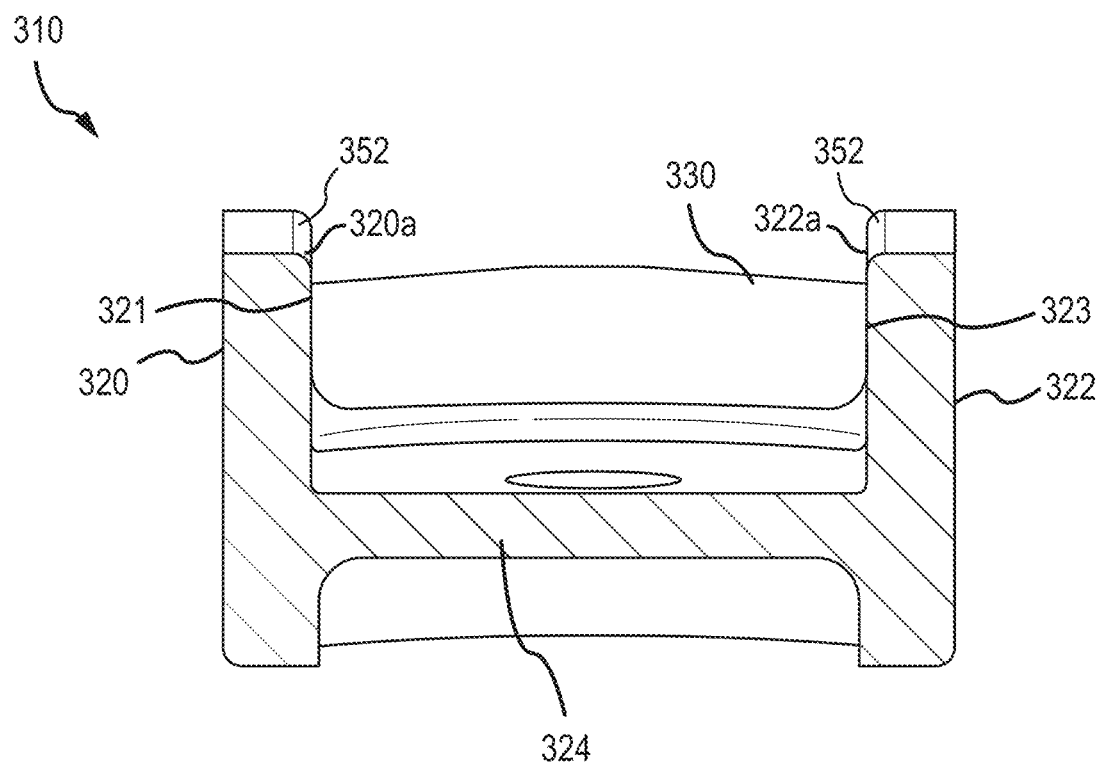
Figure 3D:
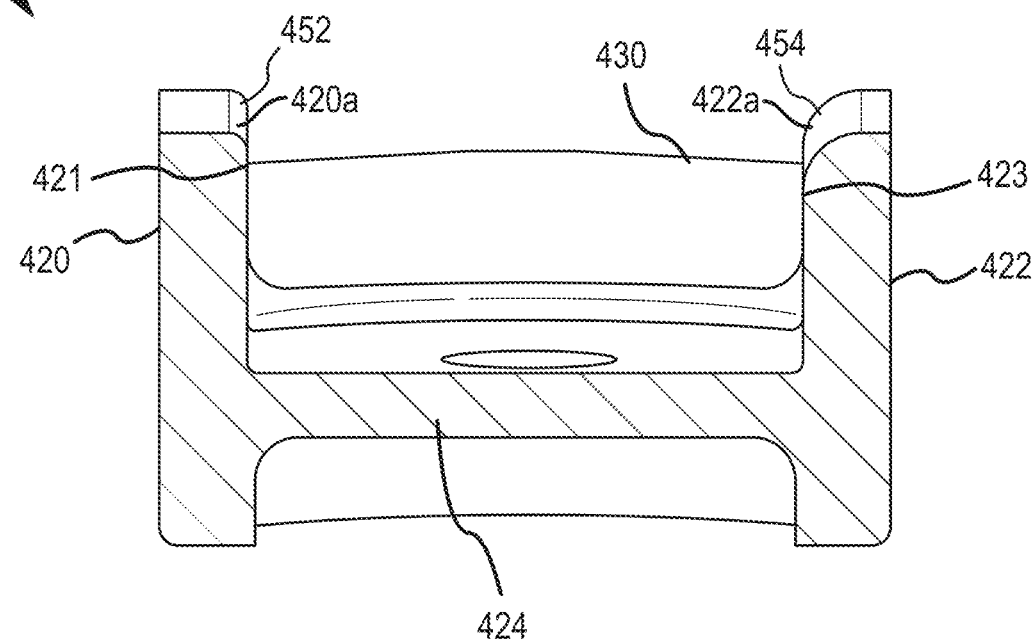

In various embodiments, first machined profile 220 a, 320 a, 420 a has a first radius of curvature and second machined profile 222 a, 322 a, 422 a has a second radius of curvature. In various embodiments, first radius of curvature is about 50 inches (about 127 centimeters) to about 100 inches (about 254 centimeters), and more specifically, about 70 inches (about 177.8 centimeters) to about 100 inches (about 254 centimeters). In various embodiments, first radius of curvature is the same as second radius of curvature. In various embodiments, first radius of curvature is either larger or smaller than second radius of curvature. As illustrated in FIGS. 3A-3D, first machined profile 220 *a*, 320 *a*, 420 *a* and second machined profile 222 *a*, 322 *a*, 422 *a* are almost straight. In various embodiments and as illustrated in FIGS. 3A-3D, first machined profile 220 *a*, 320 *a*, 420 *a* and second machined profile 222 *a*, 322 *a*, 422 *a* may be a chamfer, a bevel, a flute, a groove, a slant, a slope, or other physical feature formed onto or machined from first vertical portion 220, 320, 420 and second vertical portion 222, 322, 422, respectively. For example, a chamfer 250 is illustrated in FIG. 3B and various bevels 252, 254 are illustrated in FIGS. 3C and 3D. For example, FIG. 3D illustrates a larger radius bevel 254 and a smaller radius bevel 252. It should be understood that bevels 252, 254 are representative and not necessarily drawn to scale. In various embodiments, first machined profile 220 *a*, 320 *a*, 420 *a* and second machined profile 222 *a*, 322 *a*, 422 *a* may be each be a compound profile. That is, a series of connected angles, lines, or curves resulting in the formation of first machine profile 220 *a*, 320 *a*, 420 *a* and second machined profile 222 *a*, 322 *a*, 422 *a*. In other words, first machined profile 220 *a*, 320 *a*, 420 *a* and/or second machined profile 222 *a*, 322 *a*, 422 *a* may be a series of different radius of curvatures, or other features connected together, resulting in different angle lines. In various embodiments, first machined profile 220 *a*, 320 *a*, 420 *a* extends from a top surface of first vertical portion 220, 320, 420 to a sidewall 221, 321, 421 of first vertical portion 220, 320, 420. In various embodiments, first machined profile 220 *a*, 320 *a*, 420 *a* may further include multiple segments between the top surface of first vertical portion 220, 320, 420 and the sidewall 221, 321, 421 of first vertical portion 220, 320, 420, resulting in a compound profile. In various embodiments, second machined profile 222 *a*, 322 *a*, 422 *a* extends from a top surface of second vertical portion 222, 322, 422 to a sidewall 223 of second vertical portion 222, 322, 422. In various embodiments, second machined profile 222 *a*, 322 *a*, 422 *a* may further include multiple segments between the top surface of second vertical portion 222, 322, 422 and the sidewall 223, 323, 423 of second vertical portion 222, 322, 422, resulting in a compound profile. In various embodiments, first machined profile 220 *a*, 320 *a*, 420 *a* is formed, or machined, at an intersection of the top surface of first vertical portion 220, 320, 420 and the sidewall 221, 321, 421 of first vertical portion 220, 320, 420. In various embodiments, second machined profile 222 *a*, 320 *a*, 420 *a* is formed, or machined, at an intersection of the top surface of second vertical portion 222, 322, 422 and the sidewall 223, 323, 423 of second vertical portion 222, 322, 422. In various embodiments, the first radius of curvature and the second radius of curvature may be small enough that first machined profile 220 *a*, 320 *a*, 420 *a* and second machined profile 220 *b*, 320 *b*, 420 *b* are convex.

In various embodiments, torque bar 210, 310, 410 further includes a third vertical portion 230, 330, 430 extending between first vertical portion 220, 320, 420 and second vertical portion 222, 322, 422 and coupled to horizontal portion 224, 324, 424. In various embodiments, third vertical portion 230, 330, 430 is semi-circular in shape, extending away from first vertical portion 220, 320, 420 and second vertical portion 222, 322, 422. In various embodiments, third vertical portion 230, 330, 430 may be straight, extending from first vertical portion 220, 320, 420 to second vertical portion 222, 322, 422. In various embodiments, first vertical portion 220, 320, 420, second vertical portion 222, 322, 422, and third vertical portion 230, 330, 430 may be machined from proximal end 210 *b*, 310 *b*, 410 *b* of torque bar 210, 310, 410.

Figure 4:
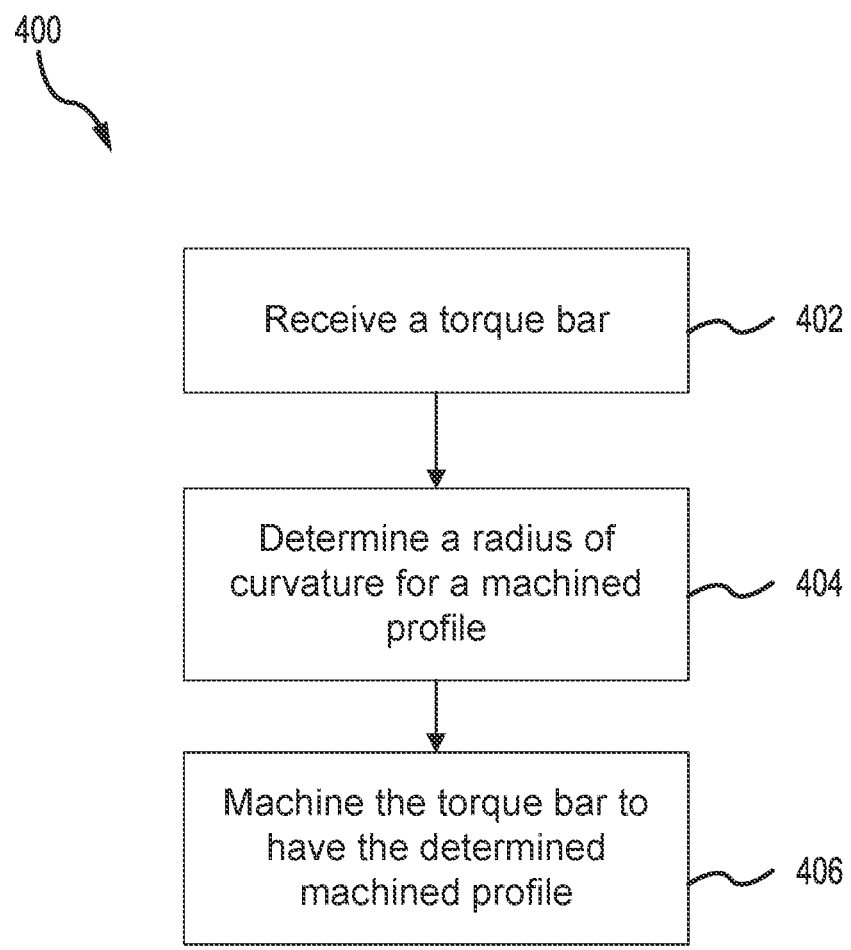
FIG. 4 illustrates a flow diagram of a method of manufacture of a profiled torque bar, in accordance with various embodiments.

Referring now to FIG. 4, a method of manufacturing a torque bar 210, 310, 410 is illustrated, in accordance with various embodiments. At block 402, a torque bar is received. The torque bar may be an example of torque bar 210, 310, 410 described above with respect to FIGS. 2A, 2B, and 3A-3D. The torque bar may have a first vertical portion and a second vertical portion. At block 404, a radius of curvature, or similar tailored profile, is determined for the machined profile of the first portion and/or the second portion. The machined profile may be an example of first machined profile 220 *a*, 320 *a*, 420 *a* and second machined profile 222 *a*, 322 *a*, 422 *a* described above. The determined radius of curvature, or similar tailored profile, may be based at least in part on a type of an aircraft, a weight of the aircraft, a size of a wheel of the aircraft, an expected load on the wheel of the aircraft, an expected load on the wheel drive lug of the wheel, a material of the torque bar 210, 310, 410, or a size of a wheel lug, among others. At block 406, the torque bar is machined to form the profile having the determined radius of curvature. Specifically, the first vertical portion and/or the second vertical portion is machined to have the profile having the determined radius of curvature.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 5% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 5% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A torque bar, comprising:
   a body;
   a distal end; and
   a proximal end, the proximal end including:
   a horizontal portion having a first side and a second side;
   a first vertical portion having a top surface, a sidewall extending from the horizontal portion toward the top surface, a first end, and a second end, the first vertical portion coupled to the first side of the horizontal portion between the first end and the second end;
   a second vertical portion having a third end and a fourth end, the second vertical portion coupled to the second side of the horizontal portion between the third end and the fourth end;
   a third vertical portion forming a curvature between the first vertical portion and the second vertical portion,
   wherein a first profile is formed in the first end of the first vertical portion and defining a surface extending from the sidewall to the top surface, and a second profile is formed in the third end of the second vertical portion, and wherein the second vertical portion and the third vertical portion further define the surface.

2. The torque bar of claim 1, wherein the first profile has a first radius of curvature and the second profile has a second radius of curvature.

3. The torque bar of claim 2, where the first radius of curvature is the same as the second radius of curvature.

4. The torque bar of claim 2, wherein the first radius of curvature is different than the second radius of curvature.

5. The torque bar of claim 2, wherein the first radius of curvature is about 50 inches to about 120 inches.

6. The torque bar of claim 1, wherein the first profile is chamfered and the second profile is chamfered.

7. A wheel assembly, comprising:
   a wheel having an axially exterior outer edge and an axially interior surface;
   a drive lug coupled to the axially exterior outer edge; and
   a torque bar coupled to the wheel and the drive lug, the torque bar including:
   a proximal end coupled to the drive lug; and
   a distal end coupled to the axially interior surface of the wheel;
   wherein the proximal end includes:
   a horizontal portion having a first side and a second side;
   a first vertical portion having a top surface, a sidewall extending from the horizontal portion toward the top surface, a first end, and a second end, the first vertical portion coupled to the first side of the horizontal portion between the first end and the second end;
   a second vertical portion having a third end and a fourth end, the second vertical portion coupled to the second side of the horizontal portion between the third end and the fourth end;
   a third vertical portion forming a curvature between the first vertical portion and the second vertical portion,
   wherein a first profile is formed in the first end of the first vertical portion and defining a surface extending from the sidewall to the top surface, and a second profile is formed in the third end of the second vertical portion, and wherein the second vertical portion and the third vertical portion further define the surface.

8. The wheel assembly of claim 7, wherein the first profile has a first radius of curvature and the second profile has a second radius of curvature.

9. The wheel assembly of claim 8, where the first radius of curvature is the same as the second radius of curvature.

10. The wheel assembly of claim 8, wherein the first radius of curvature is different than the second radius of curvature.

11. The wheel assembly of claim 8, wherein the first radius of curvature is about 50 inches to about 120 inches.

12. The wheel assembly of claim 7, wherein the first profile is chamfered and the second profile is chamfered.

13. A brake assembly, comprising:
    a wheel;
    a drive lug coupled to the wheel; and
    a torque bar coupled to an inner periphery of the wheel and the drive lug, the torque bar including:
    a proximal end coupled to the drive lug, the proximal end including:
    a horizontal portion having a first side and a second side;
    a first vertical portion having a top surface, a sidewall extending from the horizontal portion toward the top surface, a first end and a second end, the first vertical portion coupled to the first side of the horizontal portion between the first end and the second end;

a second vertical portion having a third end and a fourth end, the second vertical portion coupled to the second side of the horizontal portion between the third end and the fourth end, a second profile formed in the third end of the second vertical portion;

a third vertical portion forming a curvature between the first vertical portion and the second vertical portion;

a first profile formed in the first end of the first vertical portion and defining a surface extending from the sidewall to the top surface; and a third profile formed in the third vertical portion such that the second profile and the third profile further define the surface.

14. The brake assembly of claim 13, wherein the first profile has a first radius of curvature and the second profile has a second radius of curvature.

15. The brake assembly of claim 14, wherein the first radius of curvature is about 50 inches to about 120 inches.

16. The brake assembly of claim 14, wherein the first radius of curvature is different than the second radius of curvature.

17. The brake assembly of claim 13, wherein the horizontal portion physically contacts the drive lug.

* * * * *